(12) United States Patent
Gariepy et al.

(10) Patent No.: US 10,662,045 B2
(45) Date of Patent: May 26, 2020

(54) CONTROL AUGMENTATION APPARATUS AND METHOD FOR AUTOMATED GUIDED VEHICLES

(71) Applicant: Clearpath Robotics, Inc., Kitchener (CA)

(72) Inventors: Ryan Christopher Gariepy, Kitchener (CA); Andrew Dobson, Kitchener (CA); Jesse Tebbs, Waterloo (CA); Robert Dam, Waterloo (CA); Roydyn Clayton, Seattle, WA (US)

(73) Assignee: CLEARPATH ROBOTICS INC., Kitchener (CA)

( * ) Notice: Subject to any disclaimer, the term of this patent is extended or adjusted under 35 U.S.C. 154(b) by 280 days.

(21) Appl. No.: 15/429,222

(22) Filed: Feb. 10, 2017

(65) Prior Publication Data

US 2017/0233231 A1    Aug. 17, 2017

Related U.S. Application Data

(60) Provisional application No. 62/293,948, filed on Feb. 11, 2016.

(51) Int. Cl.
*G05D 1/02* (2020.01)
*B66F 9/06* (2006.01)
*B66F 9/075* (2006.01)

(52) U.S. Cl.
CPC ............ *B66F 9/063* (2013.01); *B66F 9/0755* (2013.01); *G05D 1/021* (2013.01); *G05D 1/0238* (2013.01); *G05D 2201/0216* (2013.01)

(58) Field of Classification Search
CPC ....... B66F 9/063; B66F 9/0755; G05D 1/021; G05D 1/0238; G05D 2201/0216
See application file for complete search history.

(56) References Cited

U.S. PATENT DOCUMENTS

| 8,190,295 B1* | 5/2012 | Garretson | G05D 1/0038 700/245 |
| 9,465,388 B1* | 10/2016 | Fairfield | G05D 1/0044 |
| 9,632,502 B1* | 4/2017 | Levinson | G01S 7/4972 |
| 2015/0248131 A1* | 9/2015 | Fairfield | G05D 1/0044 701/2 |
| 2016/0327951 A1* | 11/2016 | Walton | G05D 1/0212 |

* cited by examiner

*Primary Examiner* — Genna M Mott
(74) *Attorney, Agent, or Firm* — Bereskin & Parr LLP/S.E.N.C.R.L., s.r.l.

(57) ABSTRACT

An augmentation module is described for an automated guided vehicle (AGV) deployed in a facility and including a control module for controlling a drive mechanism based on navigational data received from a navigation sensor. The module includes a inter-module communications interface connected to the control module; a memory; and a processor connected to the communications interface and the memory. The processor is configured to: obtain an operational command; generate control data to execute the operational command; convert the control data to simulated sensor data; and send the simulated sensor data to the control module.

17 Claims, 6 Drawing Sheets

CONTROL AUGMENTATION APPARATUS AND METHOD FOR AUTOMATED GUIDED VEHICLES

CROSS-REFERENCE TO RELATED APPLICATIONS

This application claims the benefit of the filing date of U.S. Provisional Patent Application No. 62/293,948 filed on 11 Feb. 2016, which is herein incorporated by reference in its entirety for all purposes.

FIELD

The specification relates generally to automated guided vehicles, and specifically to a control augmentation apparatus and method for automated guided vehicles.

BACKGROUND

Automated guided vehicles (AGVs) are employed in a variety of settings, including industrial settings such as warehouse facilities (e.g. for retrieving and moving inventory, or for in-process assembly). The deployment of some AGVs requires the accompanying deployment of physical infrastructure in the facility, such as magnetic or coloured tape, reflectors, RFID tags, and the like. Such infrastructure can be detected by the AGVs, which are in turn configured to execute instructions based on which infrastructure elements they detect.

Systems such as those described above can be time-consuming and costly to deploy, and are also not suitable in some environments. In addition, the guiding infrastructure is subject to wear and tear and accidental damage, which can result in interruptions to AGV operations while the infrastructure is repaired or replaced. Further, the above-mentioned AGVs are typically capable of executing only a limited set of instructions, requiring the system operators to translate complex spatial and process requirements into such limited instruction sets.

BRIEF DESCRIPTIONS OF THE DRAWINGS

Embodiments are described with reference to the following figures, in which.

DETAILED DESCRIPTION OF THE EMBODIMENTS

Figure 1:
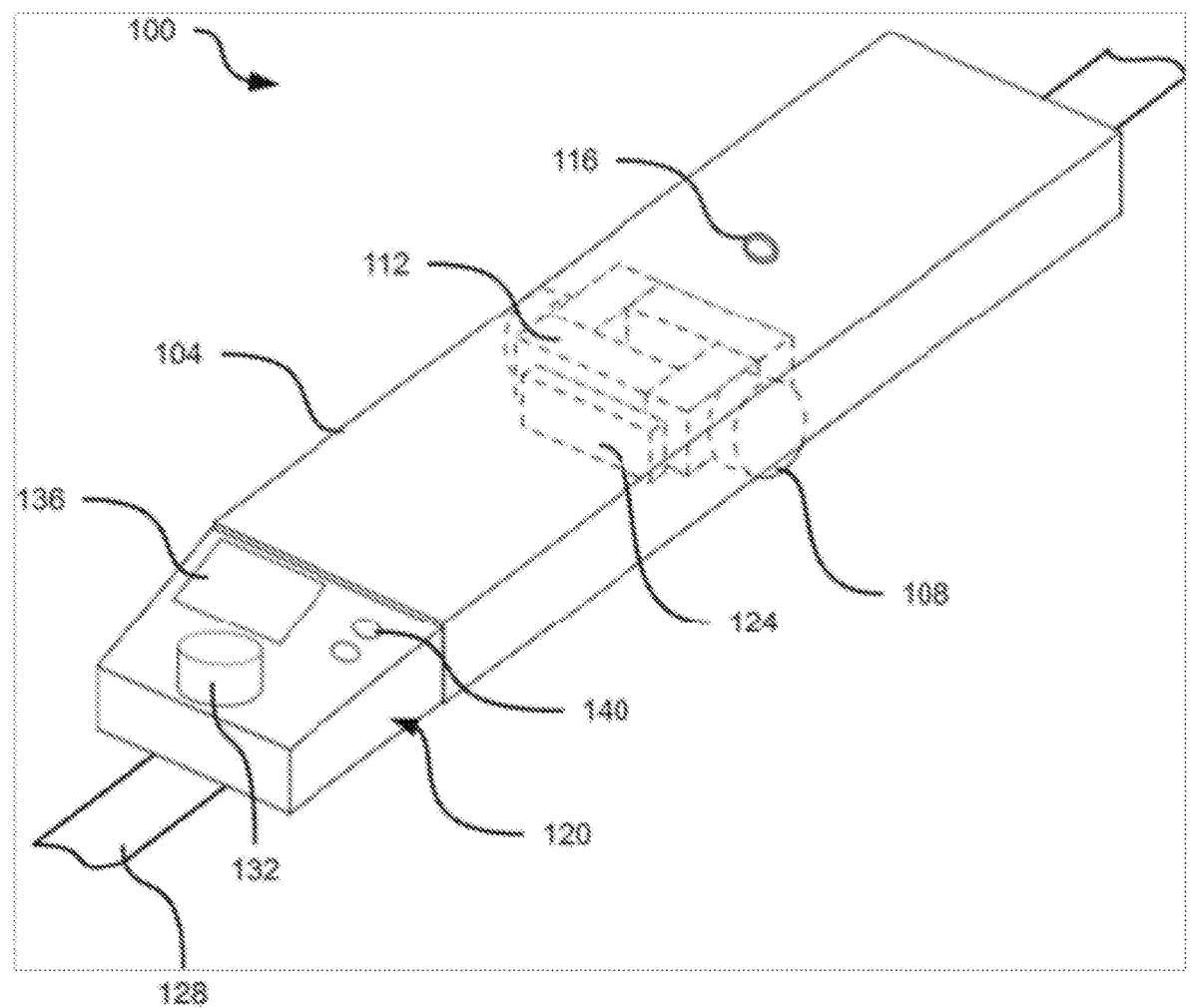
FIG. 1 depicts an unaugmented automated guided vehicle, according to a non-limiting embodiment.

FIG. 1 depicts an automated guided vehicle (AGV) 100 according to certain non-limiting embodiments. AGV 100, in the configuration shown in FIG. 1, is referred to as an unaugmented or legacy AGV. AGV 100 is a tow vehicle in the example of FIG. 1, configured to attach to a cart (not shown) and tow the cart about a facility in which AGV is deployed. However, AGV 100 can have any of a wide variety of other form factors, including other land-based configurations (e.g. with payload-bearing surfaces for carrying payloads directly on the AGV), marine configurations and aerial configurations.

AGV 100 includes a chassis 104 supporting various other components, including a locomotion assembly enabling AGV 100 to move about the facility (e.g. a building such as a warehouse, a collection of buildings, an outdoor space, and the like). The locomotion assembly, in the example of FIG. 1, includes a pair of wheels 108 powered by a drive mechanism 112. In other examples, different numbers of wheels in different positions on chassis 104 can be implemented. In addition, for marine or aerial AGVs, other locomotion assemblies can be employed that include propellers or rotors instead of, or in addition to, wheels 108.

Drive mechanism 112, in the example of FIG. 1, includes an electric motor connected to each wheel 108—that is, wheels 108 are differentially driven, permitting AGV 100 to steer by rotating each wheel 108 at a different rate. In other examples, various other drive mechanisms can be employed to drive wheels 108. AGV 100 also includes at least one tow pin 116 in the present example, which can be raised and lowered (together or independently, if multiple tow pins 116 are provided) from an upper surface of chassis 104 to attach and release AGV 100 to and from the above-mentioned carts. Tow pin 116 may be omitted in other embodiments (e.g. those in which AGV 100 bears a payload directly on its upper surface), or replaced with other structures (hooks, anchors, forks for AGVs configured to operate as forklifts, and the like) for securing loads or tools.

In addition, AGV 100 includes a control module 120. Control module 120, in general, interfaces with drive mechanism 112 to control the direction and speed of movement of AGV 100. Control module 120 can also control the deployment and retraction of tow pin 116.

Control of the movement of AGV 100 can be exerted by a processor executing a navigation application within control module 120. In the example of FIG. 1, control module 120 receives data from a navigation sensor 124 mounted adjacent to drive mechanism 112. Navigation sensor 124 is illustrated as a magnetic field sensor that detects the position of a magnetic field, such as that emitted by a strip of magnetic tape 128 placed on the floor of the facility. As will now be apparent to those skilled in the art, navigation sensor 124 typically reports a position of magnetic tape 128 relative to the center of the sensor or to one side of the sensor. Control module 120 receives the reported position of tape 128, and controls drive mechanism 112 based on the difference between the reported position and a target position stored at control module 120. Generally, the target position is centered on sensor 124, and thus control module 120 is configured to adjust the control of drive mechanism 112 to correct deviations in the position of tape 128 from the center of sensor 124. In other words, control module 120 is configured to guide AGV 100 along the length of tape 128.

AGV 100 can also include a variety of other navigation sensors for detecting associated infrastructure elements and reporting those elements to control module 120. For example, AGV 100 can be equipped with one or more cameras to detect colored tape (instead of or in addition to magnetic tape 128) or other objects (e.g. reflective markers) in the facility. In further examples, AGV 100 can be equipped with a radio-frequency identification (RFID) reader to detect RFID tags placed throughout the facility. The detection of a given RFID tag can be interpreted by control module 120 as an instruction to perform an action (e.g. stop, wait for a preconfigured time period, and the like).

AGV 100 can also include a range-finding sensor 132, such as a LIDAR sensor. Sensor 132 can be implemented as a safety sensor that interrupts the movement of AGV 100 when an obstacle is detected within a threshold distance (e.g. one meter) of AGV 100. When employed as a safety sensor, sensor 132 can be connected directly to drive mechanism 112 rather than to control module 120. In other examples, however, sensor 132 can be connected to control module, which can in turn issue any required interrupt signals when obstacles are detected by sensor 132. As will be discussed in greater detail below, sensor 132 can also be employed for navigational purposes extending beyond interrupting operation of AGV 100 in response to obstacle detections.

AGV 100 also includes a human-machine interface (HMI) for presenting status information and receiving instructions from an operator. The HMI includes, in the example of FIG. 1, a display 136 and at least one input device 140 such as a button, switch or the like. The components of the HMI are connected to the processor of control module 120. In other examples, some or all of the HMI can be omitted.

Figure 2:
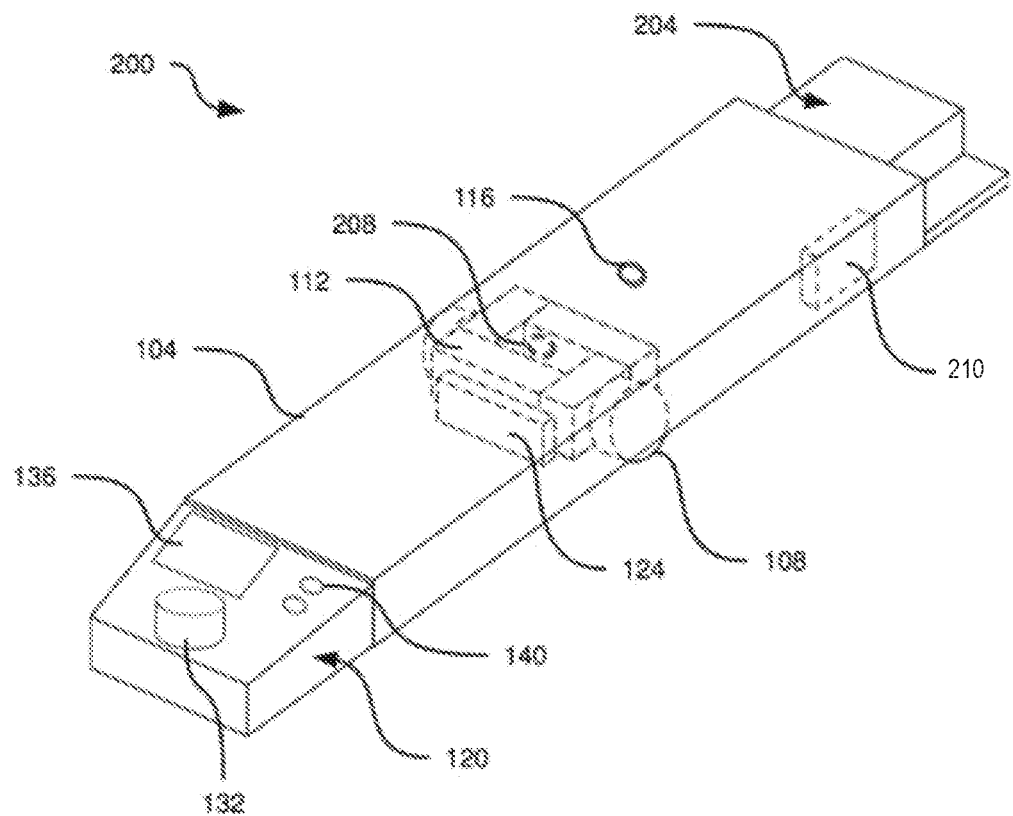
FIG. 2 depicts an augmented automated guided vehicle, according to a non-limiting embodiment.

Referring now to FIG. 2, an AGV 200 is illustrated according to certain non-limiting embodiments. AGV 200 includes the components mentioned initially herein as being omitted from AGV 100. As a result, AGV 200 is also referred to as an augmented AGV.

AGV 200 includes the components of AGV 100 as described above, and also includes an augmentation module 204 coupled to chassis 104. In the present example, augmentation module 204 is coupled to chassis 104 at the opposite end of chassis 104 from control module 120. In other embodiments, however, both control module 120 and augmentation module 204 can be coupled to chassis 104 at any suitable location. For example, augmentation module 204 can, in some embodiments, be installed in a space within chassis 104 rather than being coupled to an outer surface of chassis 104. As will be discussed in greater detail below, augmentation module 204 is configured to intermediate, at least under certain conditions, between the sensors (such as navigation sensor 124) of AGV 200 and control module 120. More specifically, augmentation module 204 can generate data defining desired movement or other operations of AGV 200, and convert such control data into simulated sensor data and send the simulated sensor data to control module 120. Control module 120, in turn, controls drive mechanism 112 based on the simulated sensor data (as mentioned earlier) and is thus enabled to guide AGV 200 even in the absence of infrastructure such as tape 128.

AGV 200 can also include additional components, such as a differential drive rotation sensor 208 coupled to drive mechanism 112 and one or more automation interfaces, such as a power data interface 210 for providing augmentation module 204 with data defining a remaining level of power (e.g. battery charge) for AGV 200. In other embodiments, however, such additional components can be omitted. In further embodiments, AGV 200 can include additional sensors, either mounted on chassis 104 or on augmentation module 204. For instance, augmentation module 204 can include auxiliary navigation sensors (e.g. additional LIDAR sensors, cameras, global positioning system (GPS) sensors, and the like).

Before a detailed discussion of the operation of AGV 200, certain internal components of AGV 200 will be described with reference to FIG. 3. As will now be apparent, various components of AGV 200, such as display 136 and sensor 208, are not shown in FIG. 3 for simplicity of illustration. It will also be apparent that other components of AGV not directly related to the present invention are not shown herein, including a power source (e.g. batteries, solar panels, fuel tank or the like) for the above-mentioned modules and drive mechanism, as well as safety systems.

Figure 3:
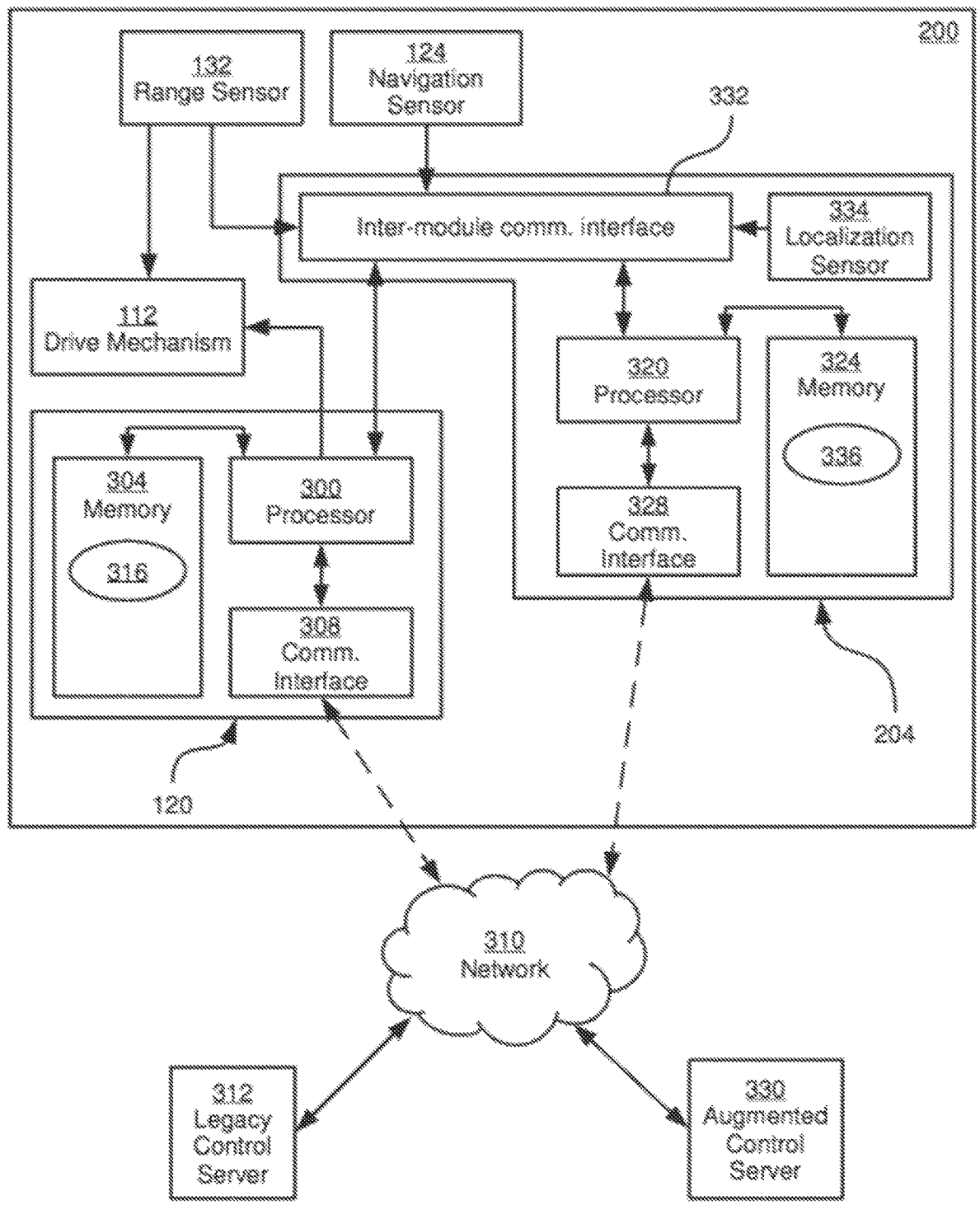
FIG. 3 depicts certain internal components of the vehicle of FIG. 2, according to a non-limiting embodiment.

As shown in FIG. 3, control module 120 includes a central processing unit (CPU) 300, also referred to as a processor 300, interconnected with a non-transitory computer-readable medium such as a memory 304. Processor 300 and memory 304 are generally comprised of one or more integrated circuits (ICs), and can have a variety of structures, as will now occur to those skilled in the art (for example, more than one CPU can be provided). Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Control module 120 also includes a communications interface connected with processor 300. Communications interface includes any necessary hardware (executing any suitable programming instructions) for connecting control module to a network 310. The nature of network 310 is not particularly limited—network 310 can be implemented as any suitable one of, or combination of, wired and wireless networks. In the present embodiment, network 310 is a local wireless network, and thus communications interface includes one or more radio assemblies for sending and receiving data via network 310. In particular, control module 120 communicates with a legacy control server 312 via communications interface 308 and network 310.

Memory 304 stores a plurality of computer readable instructions executable by processor 300, including a locomotion application 316. Application 316 contains a set of instructions for use in controlling the operation of AGV 200. Each instruction, when executed by processor 304, generates output data for controlling drive mechanism 112. Some instructions accept sensor data as inputs—for example, an instruction for following tape 128, as will now be apparent to those skilled in the art, may take the position of tape 128 as reported by sensor 124 and generate output data for drive mechanism 112 based on the deviation of the reported position of tape 128 and a target position of tape 128. Another example instruction for stopping AGV 200 may accept as input an identifier from an RFID tag, and generate output data to slow and stop operation of drive mechanism 112. Other instructions will also occur to those skilled in the art (e.g. an instruction defining which portion of a branch in tape 128 to follow).

The above-mentioned instructions can be preconfigured in memory 304. The instructions can also be deployed to memory 304, and updated in memory 304, from legacy control server 312 via network 310.

Augmentation module 204 includes a CPU 320, also referred to as a processor 320, interconnected with a non-transitory computer-readable medium such as a memory 324. Processor 320 and memory 324 are generally comprised of one or more integrated circuits (ICs), and can have a variety of structures, as will now occur to those skilled in the art (for example, more than one CPU can be provided). Memory 324 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Augmentation module 204 also includes a communications interface 328 interconnected with processor 320. Via communications interface 328 and network 310, augmentation module 204 can send and receive data to and from an augmented control server 330, as will be discussed below in greater detail. As noted above in connection with interface 308, the nature of interface 328 can vary based on the nature of network 310. In the present example, in which network 310 is a local wireless network deployed within the facility, interface 328 includes one or more radio assemblies, and any necessary supporting hardware.

Further, augmentation module 204 includes an inter-module communications interface 332. As seen in FIG. 3, interface 332 interconnects processor 320, processor 300, range sensor 132 and navigation sensor 124. Sensor 132 may also, as shown in FIG. 3, be connected directly to drive mechanism 112. As mentioned above, sensor 132 can be implemented as a safety sensor. In such implementations, in addition to providing range-finding data to interface 332, sensor 132 can send commands (e.g. interrupt commands) directly to drive mechanism 112 to interrupt the operation of AGV 200 when sensor 132 detects an obstacle within a preconfigured threshold distance of AGV 200.

Other sensors can also be connected to interface 332, including a localization sensor 334 housed in augmentation module 204. Sensor 334 may be an additional range-finding sensor (e.g. a LIDAR sensor), an image sensor such as a camera, or the like. Although the discussion below assumes that data from sensor 132 is employed by augmentation module 204 for mapping and localization processes, in some embodiments sensor 334 can be employed instead of, or in addition to, sensor 132 for such processes. Interface 332 can have a variety of structures. In the present example, interface 332 includes a plurality of electrical tie-ins intermediating between sensors 124 and 132 and control module 120, and also connecting augmentation module 204 with control module 120. In other embodiments, instead of electrical connections to processor 300, interface 332 can include optical, magnetic or other emitting devices (not shown) in proximity with range sensor 132 and navigation sensor 124 to cause sensors 132 and 124 to generate the desired sensor data and transmit such data to processor 300.

Memory 324 stores a plurality of computer readable instructions executable by processor 320, including a control application 336. Processor 320, via the execution of application 336, is configured to determine the location of AGV 200 within the facility (more specifically, within a digital map of the facility stored in memory 324). Application 336 also configures processor 320 to generate or receive operational commands, such as paths through the above-mentioned map or target locations within the map. Responsive to obtaining such operational commands, application 336 configures processor 320 to generate control data defining movements or other operations (e.g. deployment of tooling) for AGV 200. Such control data can be employed to generate operational parameters to control drive mechanism 112 to complete the operational command. However, as will now be apparent, augmentation module 204 is not directly connected to drive mechanism 112. Therefore, application 336 also configures processor 320 to convert the control data into simulated sensor data. As will be seen below, the simulated sensor data is sent to control module 120 where processor 300 (via the execution of application 316) acts on such simulated sensor data to control drive mechanism 112 according to the above-mentioned instructions. The control data generated by augmentation module 204 is therefore implemented without being sent directly to drive mechanism 112.

Figure 4:
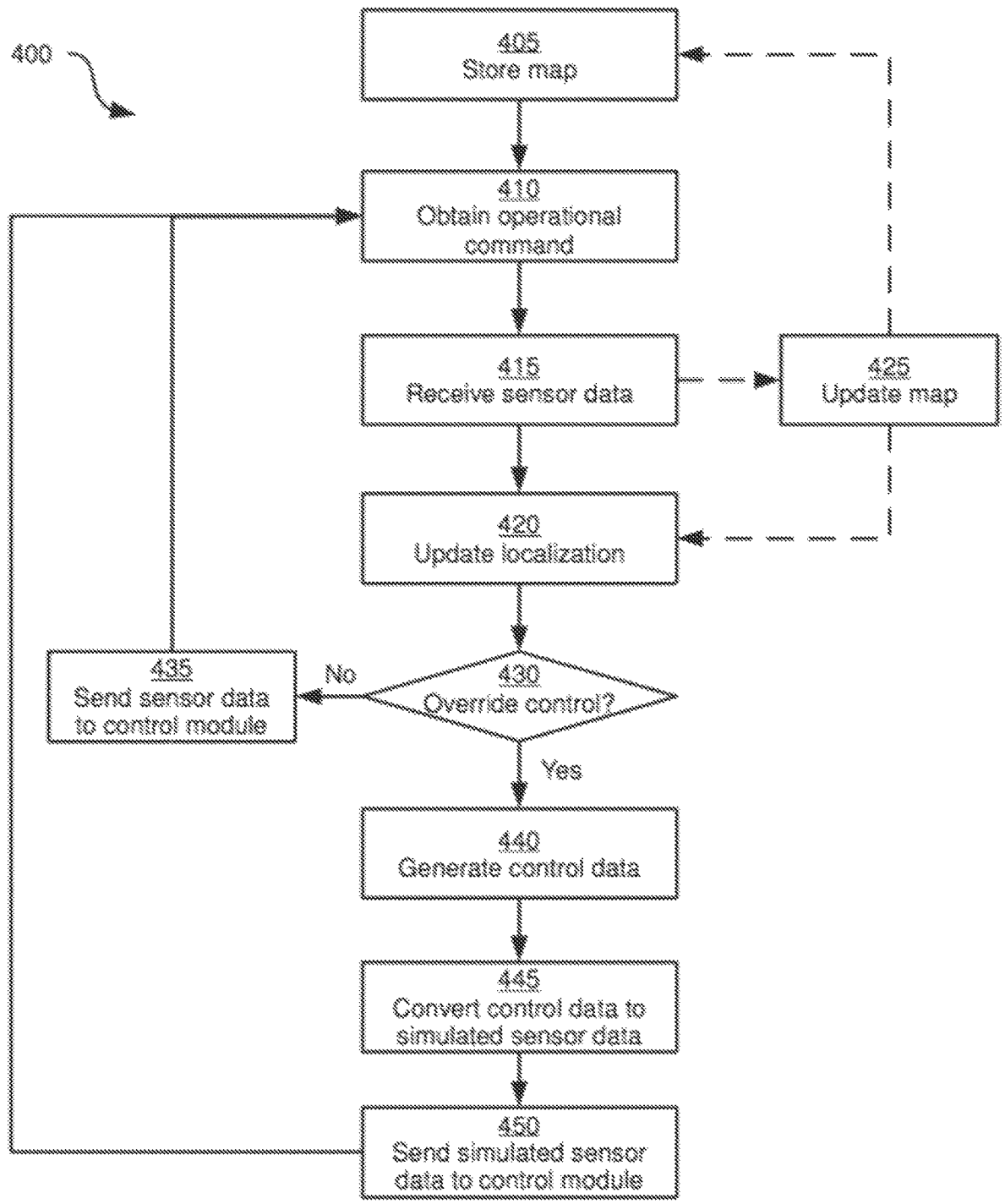
FIG. 4 depicts a method of control augmentation in the vehicle of FIG. 2, according to a non-limiting embodiment.

Referring now to FIG. 4, a method 400 of control augmentation will be discussed in conjunction with its performance in AGV 200. More specifically, the blocks of method 400 are performed by augmentation module 204 via the execution of application 336 by processor 320. As will be seen below, the performance of method 400 may permit AGV 200 to execute to a broader range of operational commands than could be executed through the operation of control module 104 alone.

Beginning at block 405, augmentation module 204 is configured to store a map of the facility in which AGV 200 is deployed. In general, the map is a digital representation of the facility, including indications of the locations of obstacles, tooling or other process stations, areas restricted to AGV 200, and the like. Various conventional techniques can be employed for generating and deploying the map to AGV 200, for example from augmented control server 330, and thus the generation and deployment of the map will not be discussed in further detail herein. The map can also, in some embodiments, include indications of the locations of navigation infrastructure physically installed within the facility, such as tape 128.

At block 410, augmentation module 204 is configured to obtain an operational command. The operational command can be obtained by receipt from server 330, for example. The operational command can also be retrieved from memory 324. For example, application 336 can contain an operational command that is to be performed at a certain time of day, or upon start-up of AGV 200.

The operational command can take a variety of forms. For example, the operational command can be a command for AGV 200 to travel to a target location identifier within the map. In other examples, the operational command can be a command for AGV 200 to follow a predefined path (e.g. a plurality of sequential line segments each having start and end locations) or portion thereof. In further examples, the operational command can be a command to execute an action, such as stopping, extending or retracting tow pin 116, and the like. In still further examples, the operational command can be a command to enable or disable the generation of simulated sensor data by augmentation module 204 (that is, a command to switch between override control by augmentation module 204 via control module 120, and control by control module 120 alone).

At block 415, augmentation module 204 is configured to receive sensor data from the sensors connected to interface 332. In the present example, therefore, processor 320 receives sensor data from range sensor 132 and navigation sensor 124. Based on the received sensor data, augmentation module 204 is configured to update the localization of AGV 200 at block 420. Various localization techniques will now occur to those skilled in the art, and a detailed discussion of localization is therefore not necessary. In general, however, at block 420 augmentation module 204 determines a current location of AGV 200 within the map stored at block 405 (i.e. within the facility in which AGV 200 operates). Such a determination may be made by comparing some or all of the sensor data (e.g. a laser scan of the immediate surroundings of AGV 200 received from sensor 132) with the map. In certain embodiments, block 420 can include simply receiving an updated location at augmentation module 204, for example from server 330. That is, server 330 can be responsible for vehicle localization (e.g. via detection of a beacon signal emitted by AGV 200 and determination of AGV location based on the signal). In such embodiments, the receipt of sensor data at block 415 may even be omitted.

In some embodiments, augmentation module 204 can also be configured to update the map stored in memory 324 at block 425, following receipt of sensor data. For example, scan data from sensor 132 may be employed to update the map to represent a previously unmapped portion of the facility, or to reflect that a structure has been relocated within the facility. In addition, data from sensor 124 can be employed to update the map to reflect the presence of tape 128.

Having updated the localization of AGV 200, augmentation module 204 is configured to determine, at block 430, whether to override the "default" control—that is, the control of AGV 200 provided by the execution of application 316 by processor 300, based on sensor data from sensors 132 and 124. In other words, the determination at block 430 is a determination of whether to generate control data and corresponding simulated sensor data at augmentation module 204, or whether to allow control of AGV 200 to be handled entirely by control module 120 (i.e. based on true sensor data).

The determination at block 430 can take a variety of forms. In some embodiments, the nature of the operational command at block 410 can influence the determination at block 430. For example, the operational command itself can be a command to set AGV 200 to a particular control mode (e.g. override control via augmentation module 204 or legacy control via control module 120 alone). In another example, the determination at block 430 can be based on sensor data received at block 415: if the sensor data indicates that no guiding infrastructure is present (e.g. magnetic tape 128 is not detected), the determination at block 430 is affirmative. In a further example, if the sensor data indicates that an unmapped obstacle is in the vicinity of AGV 200 and drive mechanism 112 is currently under the control of control module 120 alone, the determination may be affirmative. On the other hand, if sensor data indicates that infrastructure such as tape 128 is present, the determination may be negative. In a further example, sensor data may indicate the presence of a nearby RFID tag that corresponds to an instruction to switch to default control or to override control.

The determination at block 430 can also be based on the map stored at block 405. For example, the map can include indications of the locations of guiding infrastructure such as tape 128 in the facility. If, following localization at block 420, the current location of AGV 200 coincides with the location of guiding infrastructure (i.e. AGV 200 is currently located over tape 128), the determination at block 430 may be negative. In a further example, the map can also include data defining virtual guiding infrastructure, such as simulated magnetic tape (represented in the digital map, but not actually present in the facility). Such virtual infrastructure can be distinguished in the map from physical infrastructure, and if the current location of AGV 200 coincides with virtual infrastructure rather than physical infrastructure, the determination at block 430 may be affirmative.

When the determination at block 430 is negative, the sensor data received at block 415 is sent to control module 120. Control module 120, in turn, controls drive mechanism 112 by executing the above-mentioned instructions of application 316. When the determination at block 430 is affirmative, however, augmentation module 204 proceeds to block 440. At block 440, processor 320 is configured to generate control data defining movements or other tasks required of AGV 200 to perform the operational command received at block 410. For example, if the operational command is to travel to a target location within the map, the control data generated can include one or more path segments, each defined at least by a starting location and a heading (e.g. a steering angle relative to the current orientation of AGV 200). The generation of path data can be performed according to any suitable algorithms that will occur to those skilled in the art. The control data is based on the operational command, the map and the current location of AGV 200 as determined at block 420.

At block 445, having generated control data, augmentation module 204 is configured to convert the control data to simulated sensor data before transmission to control module 120. As will now be apparent, due to the lack (in the present embodiment) of a direct connection between augmentation module 120 and drive mechanism 112, augmentation module 204 exerts control over drive mechanism 112 indirectly through control module 120. Further, as noted earlier control module 120 executes a set of instructions, for example to follow magnetic tape 128 or perform actions upon detection of certain RFID tags. Thus, control module 120 may not be capable of acting on the control data generated by augmentation module 204.

To exert control over drive mechanism 112 through control module 120, augmentation module 204 therefore converts the control data into simulated sensor inputs that are known to cause control module to control drive mechanism 112 in the same manner as specified by the original control data. In the present example, memory 324 stores a plurality of conversion definitions each corresponding to a type of control data generated at block 440. Table 1 shows three example conversion definitions.

TABLE 1

Example Conversion Definitions

| Control Data Type | Sensor to Simulate | Simulated Sensor Data |
|---|---|---|
| Heading (degrees) | Navigation sensor 124 | Tape position: A x heading (mm) |
| Action: Stop | RFID Reader | Tag ID: 123 |
| Action: Deploy Tow Pin | RFID Reader | Tag ID: 456 |

In the above example, three conversion definitions are shown. Each definition corresponds to a type of control data generated by augmentation module 204 (e.g. a heading direction in degrees, a stop action and a tow pin deployment action). Each definition identifies which sensor or combination of sensors for which to generate simulated sensor data, and also indicates how to generate the simulated sensor data. For example, a stop action is converted by generating simulated sensor data that simulates the detection of a particular RFID tag (having the identifier "123") by an RFID reader. As a further example, control data specifying a heading to steer AGV 200 is converted by generated data simulating a position of tape 128 as reported by sensor 124. The simulated position can be generated by multiplying the heading by a factor "A" to obtain a reported position of tape 128 (e.g. in millimeters) along the length of sensor 124.

A wide variety of other conversion definitions will also occur to those skilled in the art. It will also now be apparent that the nature of the conversion definitions depend on the nature of the sensors being simulated. The conversion definitions need not be stored in a table as shown above. In other embodiments, conversion definitions can be stored in any suitable flat file or database structure. In further embodiments, conversion definitions can be stored as sequences of executable instructions in application 336.

Having generated the simulated sensor data at block 445, at block 450 processor 320 is configured to transmit the simulated sensor data to control module 120 via inter-module communications interface 332. The simulated sensor data thus arrives at processor 300, and is processed by control module 120 in the same manner as true sensor data to control the operation of AGV 200 (e.g. to control drive mechanism 112, tow pin 116 and the like). Performance of method 400 then returns to block 410 for the receipt of a further operational command (or the continued processing of a previous operational command).

Figure 5:
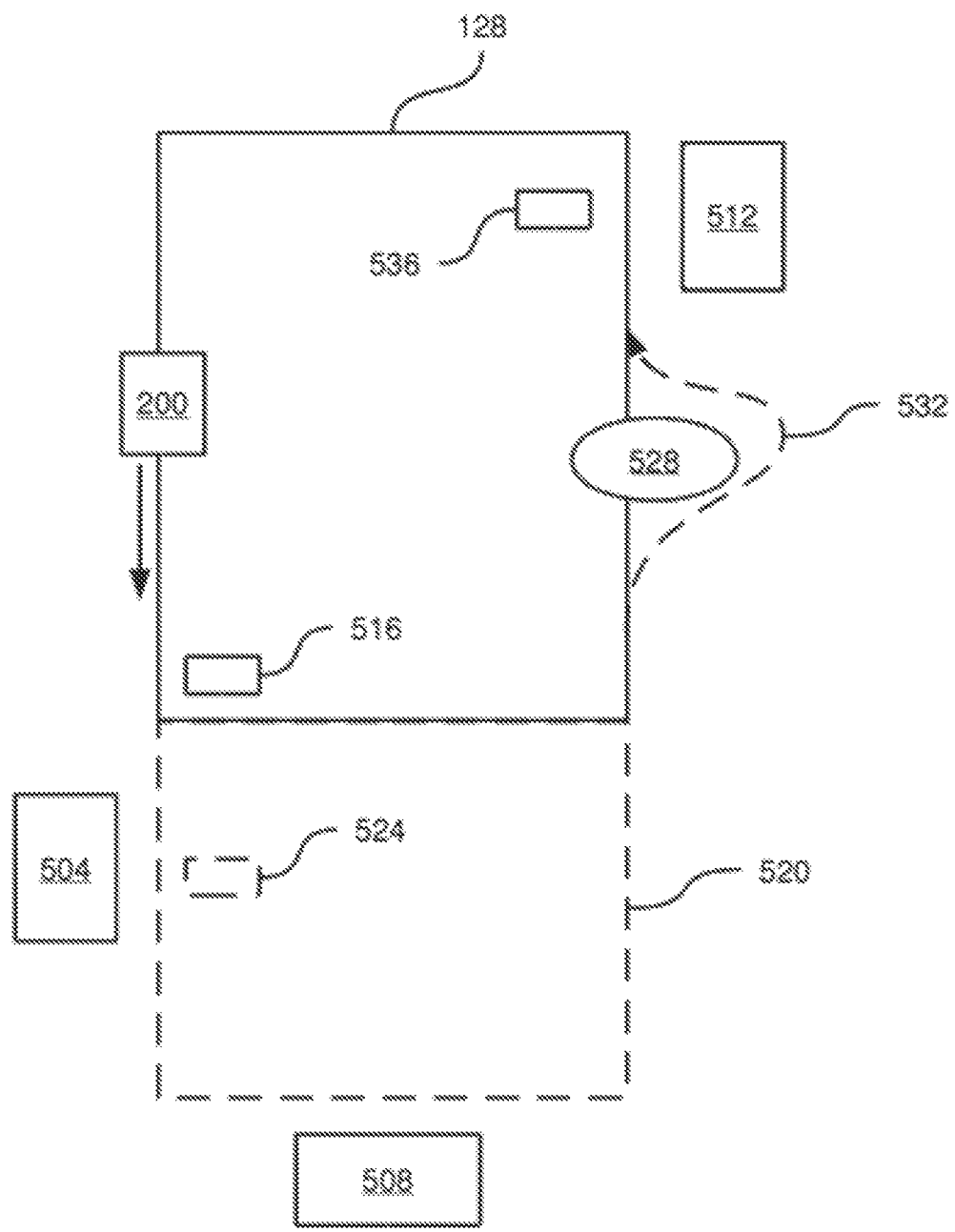
FIG. 5 depicts an example overhead view of the operation of the AGV of FIG. 2 in a facility.

Turning now to FIG. 5, a simplified overhead view is shown of a facility in which AGV 200 is deployed. As seen in FIG. 5, the facility includes a route defined by magnetic tape 128, and also includes a plurality of processing stations 504, 508, 512 (e.g. inventory loading or unloading, tooling stations and the like). Through the performance of method 400 by augmentation module 204 and the above-mentioned control processes of control module 120, AGV 200 can first be configured to travel along tape 128 without overriding control by augmentation module 204. A first RFID tag 516 can represent an instruction to switch from default control to override control (that is, an affirmative determination at block 430). Following the detection of tag 516, in the present example AGV 200 is instructed (via an operational command received at block 410) to follow a path 520. For example, the path 520 can be defined in the map stored at block 405 as a route of virtual magnetic tape. Along path 520, therefore, augmentation module 204 generates simulated sensor data to control the movement of AGV 200 via control module 120.

The map stored in augmentation module 204 can also include virtual RFID tags, such as virtual tag 524, which represents an instruction to stop adjacent to process station 504. In addition, subsequent operational commands (e.g. from server 330) can instruct AGV 200—still under the indirect control of augmentation module 204—to travel to, and stop at, process station 508. In the absence of a virtual tag stored in the map at the location corresponding to the real location of station 508, an operational command indicating a target location along path 520 can be sent by server 330 to augmentation module 204.

As AGV 200 continues to travel along path 520, AGV 200 will return onto the route defined by tape 128, at which point control may be returned to control module 120 via a negative determination at block 430. However, augmentation module 204 continues to monitor sensor data, and may detect the presence of an obstacle 528. As a result, augmentation module 204 may begin the generation of simulated sensor data to depart from tape 128 and guide AGV 200 around obstacle 528. Finally, a further RFID tag 536 may instruct control module 120 to stop AGV 200 adjacent process station 512. As will now be apparent to those skilled in the art, RFID tag 536 may be the tag simulated by augmentation module to stop AGV 200 at virtual tag 524 and at process station 508.

Various additional processes can be performed by augmentation module 204. For example, in some embodiments, sensor data received at block 415 can be compared with a map stored in memory 324 and containing data representing the locations of existing guiding infrastructure (e.g. tape 128). If the comparison reveals that tape 128 is not present where indicated by map 405, augmentation module 204 can not only override the default control by control module 120, but can also notify server 330 that the guiding infrastructure has been damaged or removed in the current location of AGV 200.

In further variations, the operational commands received at block 410 can be teleoperation commands received from a manually-controlled computing device operated by a human pilot of AGV 200. That is, AGV 200 can be piloted substantially in real-time as a remote-controlled vehicle through the performance of method 400.

In other variations, augmentation module 204 may have a direct connection to drive mechanism 112. In such embodiments, the performance of method 400 may be simplified, in that the conversion of control data to simulated sensor data may no longer be necessary. In further embodiments, control module 120 may be configured to operate in one of two modes—a legacy operation mode as described above, and a relay mode in which control module 120 accepts control data from augmentation module 204 and relays such data to drive mechanism 112 (i.e. without augmentation module 204 being required to generate simulated sensor data).

In further embodiments, augmentation module 204 can be configured to automatically determine conversion definitions, rather than have the conversion definitions preconfigured as described above.

Those skilled in the art will appreciate that in some embodiments, the functionality of processors 300 or 320 executing their respective applications may be implemented using pre-programmed hardware or firmware elements (e.g., application specific integrated circuits (ASICs), electrically erasable programmable read-only memories (EEPROMs), etc.), or other related components.

Figure 6:
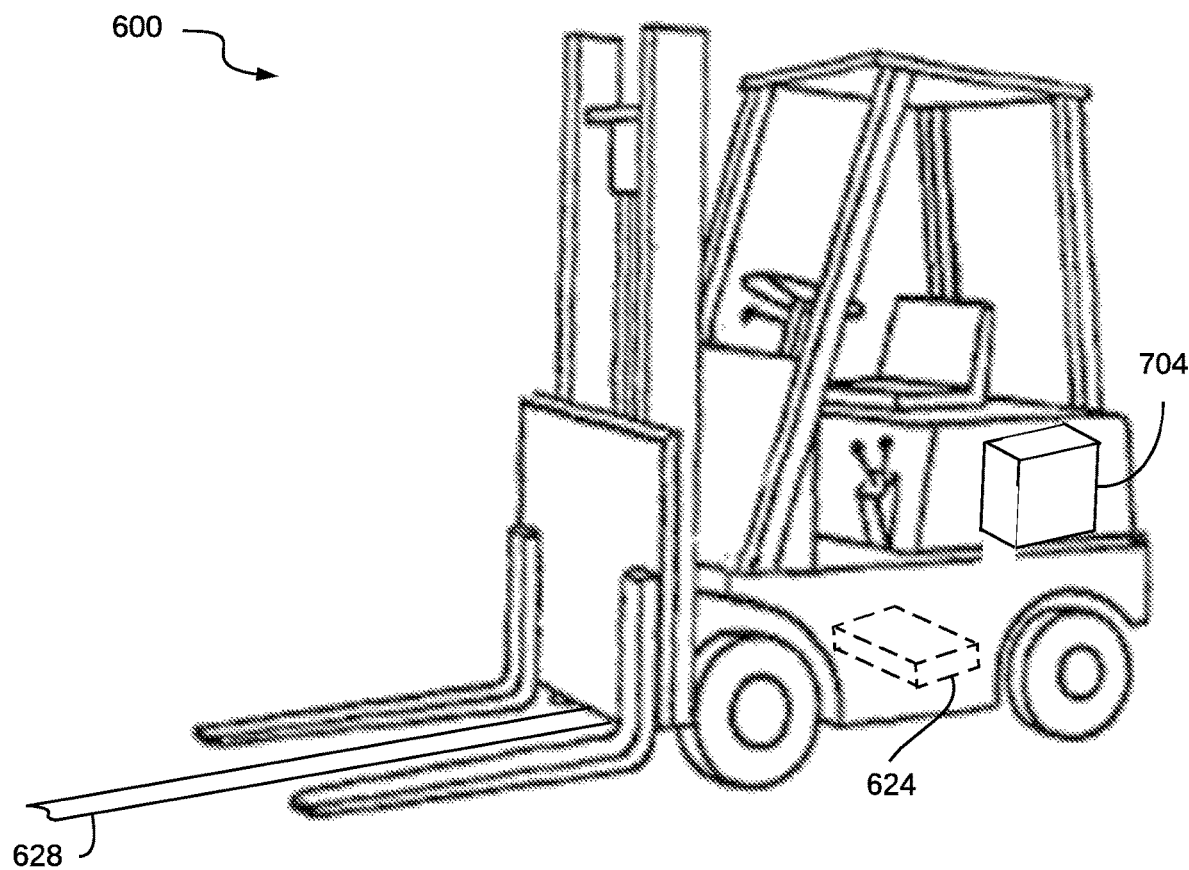
FIG. 6 depicts an example of an AGV consisting of a human-operated vehicle equipped with a control module and navigation sensors according to a non-limiting embodiment.

Referring now to FIG. 6, an AGV 600 is illustrated according to certain non-limiting embodiments. The AGV 600 is shown as a forklift, though other human-operated material-transport vehicles may also be used, such as tuggers and pallet trucks/jacks.

The forklift as depicted is considered as an AGV 600 for the purposes herein based on the inclusion of a control module (not shown in FIG. 6) and a navigation sensor 624. According to some embodiments, the AGV 600 may comprise a human-operated forklift (or other material-transport vehicle) that has been retrofitted with equipment to convert the forklift to an AGV. In some embodiments, the original equipment of the forklift may include the AGV components (e.g. control module, navigation sensors, etc.).

According to some embodiments, the navigation sensor 624 may be a magnetic field sensor for detecting a strip of magnetic tape 628 placed on the floor of the facility. As previously described, for example in reference to the AGV 100 in FIG. 1, the control module is configured to control a drive mechanism of the forklift to correct deviations in the position of the tape 628 from the center of the sensor 124. In other words, the control module is configured to guide the AGV 600 along the length of the tape 628.

The AGV 600 further includes an augmentation module 704 coupled to the forklift. The augmentation module 704 may be coupled to the AGV 600 in any suitable location. According to some embodiments, the AGV 600 can include additional components such as a differential drive rotation sensor (e.g. coupled to the drive mechanism of the forklift), and one or more automation interfaces such as a power data interface for providing the augmentation module 704 with data defining a remaining power level (e.g. battery charge) for the AGV 600. According to some embodiments, the AGV 600 can include additional sensors, either mounted on the forklift or on the augmentation module 704. For instance, the augmentation module 704 can include auxiliary navigation sensors (e.g. additional LiDAR sensors, cameras, GPS sensors, and the like).

The scope of the claims should not be limited by the embodiments set forth in the above examples, but should be given the broadest interpretation consistent with the description as a whole.

The invention claimed is:

1. An augmentation system for an automated guided vehicle (AGV) deployed in a facility and including a control module for controlling a drive mechanism based on sensor data received from a navigation sensor, the system comprising:
an inter-module communications interface connected to the control module;
a memory;
a processor connected to the communications interface and the memory, the processor configured to:
obtain an operational command defining a goal for the AGV;
prior to generating control data defining one or more operations for the AGV to execute the operational command, determine whether the sensor data received from a navigation sensor of the AGV indicates the presence or absence of guidance infrastructure for use in a default control mechanism of the AGV; and
when the sensor data indicates the absence of the guidance infrastructure, override the default control mechanism, wherein overriding the default control mechanism comprises:
generating the control data defining the one or more operations for the AGV to execute the operational command;
converting the control data to simulated sensor data to enable the control module to control the drive mechanism in the absence of guidance infrastructure, wherein the simulated sensor data corresponds to sensor data that would have been generated by the navigation sensor in the presence of the guidance infrastructure and converting the control data to simulated sensor data comprises:
determining one or more sensors to simulate based on one or more data types of the control data, and
determining the simulated sensor data required to trigger the one or more operations defined by the control data; and
sending the simulated sensor data to the control module, whereby the control module is operable to control the drive mechanism in the absence of the guidance infrastructure to execute the operational command.

2. The augmentation system of claim 1, the memory configured to store a map of the facility; the processor further configured to:
receive, via the inter-module communications interface, the sensor data from the navigation sensor of the AGV;
based on the received sensor data and the map, determine a current position of the AGV relative to the map.

3. The augmentation system of claim 2, wherein the navigation sensor includes at least one of a magnetic field sensor and a range-finding sensor.

4. The augmentation system of claim 2, wherein the navigation sensor includes a range-finding sensor, the processor further configured to:
compare the sensor data to the map; and
update the map with at least a portion of the sensor data.

5. The augmentation system of claim 2, the processor further configured to:
compare the sensor data with indications of guidance infrastructure proximal to the current position of the AGV in the map; and
when the sensor data and the indications do not match, transmit a notification to a server that the guidance infrastructure may be damaged.

6. The augmentation system of claim 1, the memory configured to store a plurality of conversion definitions each corresponding to a data type of control data; the processor configured to convert the control data to the simulated sensor data by retrieving one of the definitions corresponding to the data type of the control data.

7. The augmentation system of claim 6, the processor further configured to determine the conversion definitions.

8. The augmentation system of claim 1, the processor further configured to obtain the operational command by receiving the operational command from a pilot-operated computing device.

9. The augmentation system of claim 1, the processor further configured to obtain the operational command by detecting an obstacle in the path of the AGV.

10. A method of navigating an automated-guided vehicle ("AGV") comprising:
navigating the AGV in an environment to execute an operational command using a control module of the AGV based on guiding infrastructure within the environment comprising:
received a sensor input indicative of the guiding infrastructure; and
controlling a drive mechanism of the AGV based on the sensor input; and
using an augmentation system coupled to the AGV to store a map of the environment;
using the augmentation system to determine a location of the AGV relative to the map;
using the augmentation system to determine whether at least one control-override criterion has been met based on the location of the AGV; and
using the augmentation system to navigate the AGV in response to the at least one control-override criterion having been determined comprising operating the augmentation system to:
generate control data defining one or more operations for the AGV to execute the operational command;
convert the control data to simulated sensor data to enable the control module to control the drive mechanism without the guiding infrastructure, wherein the simulated sensor data corresponds to sensor data that would have been generated by a sensor when the guiding infrastructure is present and converting the control data to simulated sensor data comprises:
determining one or more sensors to simulate based on one ore more data types of the control data, and
determining the simulated sensor data required to trigger the one or more operations defined by the control data; and
transmitting the simulated sensor data to the control module; and
operating the control module to control the drive mechanism of the AGV based on the simulated sensor data;
wherein the control module interprets the simulated sensor data in place of the sensor input, and wherein using the augmentation system to navigate the AGV is not based on the guiding infrastructure.

11. The method of claim 10, wherein the at least one control-override criterion is further based on the map of the environment.

12. The method of claim 11, wherein the map of the environment indicates a location of the guiding infrastructure, and using the augmentation system to determine whether the at least one control-override criterion has been met comprises determining that the at least one control-override criterion has been met when the location of the vehicle is not the same as the location of the guiding infrastructure.

13. The method of claim 11, wherein the map of the environment indicates a location of virtual guiding infrastructure, and using the augmentation system to determine whether the at least one control-override criterion has been met comprises determining that the at least one control-override criterion has been met when the location of the vehicle is the same as the location of the virtual guiding infrastructure.

14. The method of claim 10, further comprising:
receiving the operational command indicative of a control-override command;
wherein using the augmentation system to determine whether the at least one control-override criterion has been met comprises determining that the at least one control-override criterion has been met based on the control-override command.

15. The method of claim 10, wherein using the augmentation system to store the map comprises using the augmentation system to generate the map.

16. The method of claim 10, wherein using the augmentation system to store the map comprises receiving the map from a server in communication with the augmentation system.

17. The method of claim 10, wherein using the augmentation system to determine the location is based on input received from at least one of a range sensor and an image sensor.

* * * * *